Figure 1:
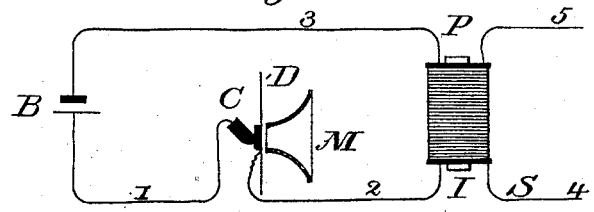

(No Model.)

J. J. CARTY.
TELEPHONY.

No. 363,449. Patented May 24, 1887.

Witnesses.
Geo. Willis Pierce,
F. J. F. Schwarz.

Inventor:
John J. Carty.

UNITED STATES PATENT OFFICE.

JOHN J. CARTY, OF CAMBRIDGE, ASSIGNOR TO THE AMERICAN BELL TELEPHONE COMPANY, OF BOSTON, MASSACHUSETTS.

TELEPHONY.

SPECIFICATION forming part of Letters Patent No. 363,449, dated May 24, 1887.

Application filed January 9, 1885. Serial No. 152,386. (No model.)

*To all whom it may concern:*

Be it known that I, JOHN J. CARTY, residing at Cambridge, in the county of Middlesex and State of Massachusetts, have invented certain Improvements in Telephony, of which the following is a specification.

My invention relates to that class of instruments known as "battery-telephones," in which the strength of a continuous current is increased or diminished by varying the pressure between or area of, or by varying the intimacy of contact between, conducting contact points or bodies through which the current passes.

It also more especially relates to a new organization of circuits and batteries in connection with such telephones whereby the efficiency in operation with a given amount of battery is greatly amplified.

It is well known that the apparatus most generally used for producing such variations consists, broadly stated, of a vibrating transmitting-diaphragm and one or more pairs of contact-electrodes, one of the said electrodes being usually formed of carbon. It is also usual to provide an induction-coil the primary circuit whereof is connected in circuit with the said electrodes and the vitalizing-battery. The induction-coil serves as an amplifier as well as an equalizer, whereby the transmitter is enabled to be successfully operated on short or long circuits alike, the secondary circuit of the induction-coil being included in the main-line circuit. The electro-motive force developed in the secondary helix of the induction-coil (which must be regarded as the source of the induced electricity or of the current flowing in the secondary or main-line circuit and capable of acting upon the distant telephone-receiver) is proportional to the strength of current flowing in the primary or battery circuit, to the distance of the secondary from the primary, to the length of wire in the secondary coil which is subject to inductive action, and to the rapidity and extent of the variation in strength or direction of the electric currents flowing in the primary circuit. The strength of the electrical currents flowing in the main-line or secondary circuit depends upon the electro-motive force developed in a secondary coil and the total resistance of the circuit. With a given battery and form of coil the effective current in the secondary coil and main circuit is then dependent upon the extent of the variation of the current flowing in the primary coil.

Heretofore, and prior to my invention, many attempts have been made to provide means which will produce greater variations in the strength of the primary current, and to produce thereby a more effective transmitter. These attempts have, so far as my knowledge extends, been exclusively in the direction of a multiplication of variable-resistance contacts and in causing the primary current to flow through a number of such contacts arranged either serially or in multiple arc. Experience has, however, demonstrated that these methods have not exhibited the increase in practical efficiency which was anticipated, and I ascribe the failure of the same to the impossibility of causing the several contact-electrodes to work with absolute identity and synchronism.

In consideration of these circumstances, which render it difficult or impracticable to produce increased variations in the primary current by means of multiplying the variable-resistance contacts, my invention aims at effecting such an amplified variation by means of a certain special arrangement of induction-coils and batteries; and to that end my invention consists in the combination of a single variable resistance or set of contact-points with any desired number of ordinary induction-coils and batteries, and also in the hereinafter-described arrangement of circuits and mode of connecting the several appliances, whereby an equal variation is produced in each one of the primary coils, which thus are enabled to act with united effect upon the main-line circuit through their secondaries, which may be connected either serially or in parallelism.

Figure 2:
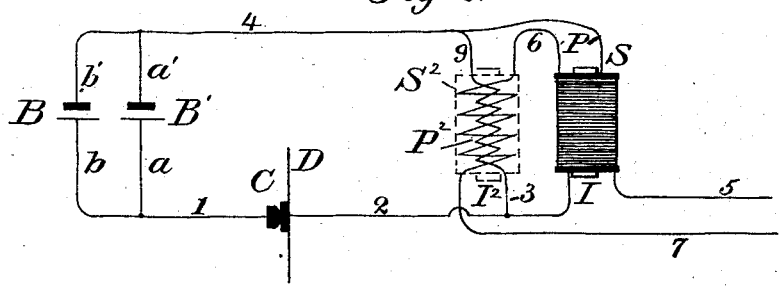
Figure 3:
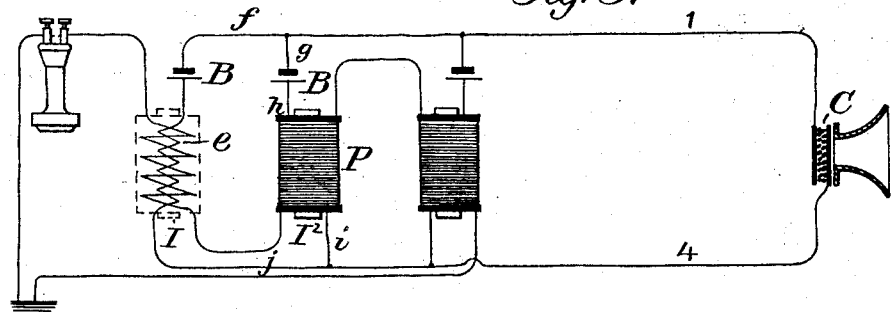
Figure 4:
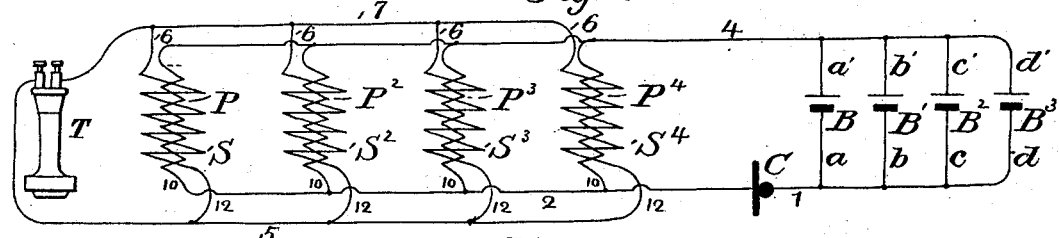
Figure 5:
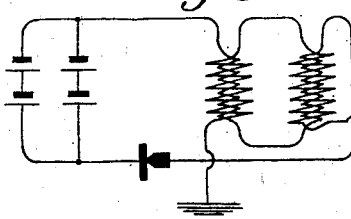

In the drawings which illustrate and constitute a part of this specification, Figure 1 represents a contact-telephone of the Berliner type connected up with an induction-coil in the usual manner. Fig. 2 shows the simplest form of my invention, one of the induction-coils being delineated in skeleton. Fig. 3 is a modified and more extended organization of transmitting devices, showing three induction-coils and batteries, the secondaries of all of the said coils being connected *seriatim*. Fig. 4 shows four batteries and induction-coils, the several secondaries being connected in multiple arc with the main line; and Fig. 5 is a modified form of Fig. 2, showing increased battery in each battery branch.

The ordinary arrangement of circuits represented in Fig. 1 shows a single cell of battery B in direct circuit with a variable-resistance contact, C, of the Berliner type, (the same of course being operated by a diaphragm, D, and mouth-piece M in a manner well understood,) and the primary circuit P of an induction-coil, I. The secondary circuit S of the coil leads outward to line by wires 4 and 5. The course of the battery-circuit may be traced from one pole of the battery B, by wire 1, to contact C, thence by wire 2 to and through primary coil P, and thence back to the battery by wire 3.

Assuming the minimum resistance of the contact C as one unit and its maximum resistance as five units, the electro-motive force of the cell B as one unit, the internal resistance of the primary coil also as one unit, we find the maximum current circulating in the primary coil to be equal to .333 of a unit of current, (the current strength in units being of course calculated by ohms law—*i. e.*, by dividing the electro-motive force in units by the resistance in units.) The minimum current flows in the same coil when the contact resistance is at its highest, and in figures has a value of .143 of a unit. The variation between the highest and lowest value is therefore .333 less .143, or .190, and an induced electro-motive force corresponding to such variation is consequently developed in the secondary coil and traverses the main circuit.

Approaching Fig. 2, the first exemplification of my invention, it will be seen that two separate batteries, B and B', are joined in parallelism with one another. The wires $a\ b$ lead from one side of each battery to the wire 1, and thence to the single variable resistance. The wires $b'$ and $a'$ lead from the other pole of the two batteries and are both attached to the wire 4. A wire, 2, leads, as in Fig. 1, from the contact C to the induction-coils. I use in this case two induction-coils, I and I², and the primary coils P P² thereof are connected in multiple arc between the wires 2 and 4 by means of the branch wires 9 and 3. The resistance of the primary coils should be equal, and the internal resistance and electro-motive force of the two batteries is also equal. I have shown one of the induction-coils, I², in dotted lines. The main line entering by wire 5 passes to the secondary coil S of I, then by wire 6 to the secondary S² of I², and out by wire 7 to line or ground, the two secondary coils being connected in series. The electrical condition of this arrangement is that the two batteries, and also the two primary coils, are connected in multiple arc and the two secondaries in series. The current developed by the two batteries connected as one will divide equally between the two primary coils, and, reuniting beyond them, will pass through the contact resistance back to the batteries. The electro-motive force of the two batteries connected as shown is still 1. The internal resistance of the batteries is, however, halved, and is .5. The joint resistance of the two primary coils I each is also .5, while the minimum and maximum resistance of the contact C is unchanged. With the minimum resistance of contact a maximum current passes through the said contact of .5; but as it splits and divides between the two primary coils, the current through each coil has of course a value of .25, while when the contact resistance is at its highest the current strength falls as a total to .166, and in each coil to .083. The extent of variation in each coil in this case is .167, while the total variation of the sum of the two is of course twice that amount—*i. e.*, .334. Now, as the extent of variation with but one cell of battery and one coil is but .190, it follows that we gain .144 by using the two coils and cells. In the amplification of my system shown in Fig. 4 four cells in multiple arc are employed, as also four induction coils with their primaries in multiple arc. In some cases, depending on the amount of resistance contained in the main line, I find it preferable to connect the secondary coils also in multiple arc. They are shown in this figure as being so connected. The connections of the primary and battery circuits are identical with those shown in Fig. 3. The secondary or main-line circuit is shown as extending in main wires 5 and 7 from the telephone T, which may represent the distant station, and the secondary coils constitute bridges between the two main wires 5 and 7, the said bridges also being arranged in parallelism with one another and leading by the branch wires 12 from the main wire 5 and by branch wires $b$ from the main wire 6. The advantage produced by the addition of coils and batteries when so arranged is continued in this case by reason of the continued fall in the normal resistance of the circuit, due to the additional paths provided by the arrangement of the additional primary coils, and also by the increased surface of the battery-plates when so arranged, the electro-motive force continuing constant. The total variation in this instance amounts to .460, an increase of variation over two cells and coils of .126.

Fig. 3 exemplifies a slightly-different arrangement, the batteries being each placed in their special primary-coil branch. Inasmuch, however, as the variable resistance C is in the circuit 1 and 4, through which the combined current passes, the result is the same. The main line passes through the several secondaries serially, as in Fig. 2. I am not, howeverrestricted to a single cell of battery in each branch. As shown in Fig. 5, I may in the said branches include two or more such cells, as may be required, with, of course, a corresponding increased effect.

The increased variation is not fully equal to the increase in the number of cells and coils—that is, by doubling the appliances, and thus halving the battery and coil resistance, I do not reach a double amount of variation, because the contact and leading wires are a constant element in the circuit—and for this reason I prefer to use leading-wires and connections having a resistance as low as possible. The variation is, however, much greater than can be effected with the same number of induction-coils and batteries arranged in any other way, and I may extend the system considerably, such extension being only limited by the amount of current capable of passing the contact-electrode without causing spark. Transmitters of the "Hunnings" type will work most efficiently when a considerable number of cells of battery are associated with them. Such transmitters therefore are well adapted to be employed in connection with my invention, and an instrument of this class is accordingly indicated in Fig. 3. Although I have referred to lowest and highest contact resistance as being, respectively, one and five units, and also specifically to the electrical magnitude of the other appliances, it must be understood that such reference is entirely illustrative and not in any sense restrictive.

In addition to the advantage of increasing the operative variation of the primary current without foregoing the advantage of a single contact operated by a diaphragm, and thus greatly amplifying the secondary or main-line current, I desire to point out another advantage accruing from my invention—viz., that a much greater current may be passed through the variable-resistance contact C without injury to the electrodes from sparks, because the extra current due to the self-induction of the coils, which is the chief source of the spark, has in each case a short circuit, which may be illustrated in Fig. 3, where the extra current generated in the primary coil of I passes over the short circuit via the coil-wire $e$, battery B, wires $f$ and $g$, through the primary P of coil I², and by wires $i$ and $j$ back to its originating point, being thus practically neutralized. Although the best results are obtained by having batteries of equal and uniform resistance and primary coils also having uniform resistance, such conditions are not absolutely essential, and a slight variation may occur without harmful results.

I have practically operated battery-transmitters connected and arranged in accordance with my hereinbefore-described invention, and have found them to show marked improvement over the ordinary arrangements. I am fully aware that it is not new to use a number of induction-coils in association with a single transmitting-instrument, and I do not claim such a combination; but so far as I am aware multiple contacts have always been employed in such cases, and it is an important feature of my invention that I employ but one vibratory contact. I am, moreover, aware that a number of induction-coils have heretofore been employed in combination with a transmitter and an equal number of separate batteries, and I do not broadly claim such an organization. In all such cases, however, there has been a point of variable resistance controlled by the diaphragm for each battery and primary coil. The disadvantages of such an arrangement I aim to avoid, and the essence of my invention lies in the fact that I employ but one variable point or transmitting resistance, and that there can therefore be no confusion, conflict, or inequality in the co-operation of the several electric waves or undulations developed, such confusion being inherent in the use of a plurality of variable-resistance centers.

I claim—

1. The combination, substantially as hereinbefore set forth, of two or more batteries connected in multiple arc, an equal number of induction-coils, the primary helices of which are also connected in multiple arc, connecting-wires uniting the said batteries with the said primary coils, a single variable-resistance contact included in one of the said connecting-wires, whereby the strength of current flowing through the primary coils may be varied, and a main circuit connected, as described, with the secondary helices of said induction-coils.

2. The combination, in a telephone transmitting apparatus, of a local circuit, two or more batteries therefor arranged in multiple arc and adapted to energize said circuit, a series of induction-coils equal in number to the said batteries, having their secondary coils included in a main telephonic circuit and their primary coils connected in multiple arc, as shown and described, with the local circuit, together with a single variable-resistance contact adapted to be actuated by a vibrating diaphragm, and connected in the said local circuit between the primary coils and the batteries, so that the entire battery-current may pass therethrough and be varied thereby, substantially as described.

3. A transmitting-telephone apparatus consisting of a diaphragm and a single variable-resistance contact operated thereby, a primary circuit including the said contact, and the primary helices of two or more induction-coils arranged in multiple arc and energized by the current of two or more batteries similarly connected together, with the secondary helices of said induction-coils connected, substantially as described, and for the purposes specified.

4. The combination, with the variable-resistance contact, center, or chamber of a telephone-transmitter, of a battery-circuit in which the said variable resistance is included, and the primary helices of two or more induction-coils arranged in multiple arc and each constituting a bridge between the two main lines of the said battery-circuit, whereby each primary helix is caused to complete a short circuit independent of the battery, and contact resistance with each other primary helix in the system within which the extra current generated in each coil may circulate and be neutralized, the secondary helices of said induction-coils being connected in series to line, substantially as described.

5. The combination in a telephonic transmitting apparatus, of two or more batteries connected in multiple arc, two or more induction-coils having secondary helices connected through a main circuit with a telephone, and their primary helices connected in multiple arc, a local circuit connecting the polar extremities of the combined batteries with the polar extremities of the combined primary helices, and a variable-resistance contact included in said local circuit between the said batteries and the said primaries, whereby a single contact is enabled to vary the current flowing in all of the coils, substantially as hereinbefore described.

In testimony whereof I have signed my name to this specification, in the presence of two subscribing witnesses, this 6th day of January, 1884.

JOHN J. CARTY.

Witnesses:
GEO. WILLIS PIERCE,
F. J. F. SCHWARTZ.